United States Patent [19]

Ogaki

[11] Patent Number: 4,672,554

[45] Date of Patent: Jun. 9, 1987

[54] SOFTWARE VENDING INSTRUMENT

[75] Inventor: Hirokazu Ogaki, Nagoya, Japan

[73] Assignee: Brother Kogyo Kabushiki Kaisha, Aichen, Japan

[21] Appl. No.: 608,551

[22] Filed: May 8, 1984

[30] Foreign Application Priority Data

| May 19, 1983 | [JP] | Japan | 58-88073 |
| May 19, 1983 | [JP] | Japan | 58-88074 |
| May 19, 1983 | [JP] | Japan | 58-88075 |
| May 19, 1983 | [JP] | Japan | 58-88076 |

[51] Int. Cl.⁴ .................. G06F 15/21; G06F 15/44
[52] U.S. Cl. ............................ 364/479; 364/410; 364/900
[58] Field of Search ............ 364/478, 479, 401, 404, 364/405, 406, 410, 200 MS File, 900 MS File; 369/84, 85; 360/15; 235/379, 380, 381

[56] References Cited

U.S. PATENT DOCUMENTS

| 3,718,906 | 2/1973 | Lightner | 360/15 X |
| 3,990,710 | 11/1976 | Hughes | 360/15 X |
| 4,141,045 | 2/1979 | Sheehan | 360/92 X |
| 4,227,220 | 10/1980 | Brown | 360/15 X |
| 4,240,120 | 12/1980 | Padwa | 360/15 |
| 4,414,467 | 11/1983 | Gould | 235/379 X |
| 4,593,376 | 6/1986 | Volk | 364/479 |
| 4,597,058 | 6/1986 | Izumi et al. | 364/900 |

FOREIGN PATENT DOCUMENTS

| 0096465 | 12/1983 | European Pat. Off. | 360/15 |
| 2013865 | 2/1983 | United Kingdom | 360/15 |

Primary Examiner—Joseph Ruggiero
Attorney, Agent, or Firm—Browdy and Neimark

[57] ABSTRACT

A software vending instrument comprising a memory for storing a plurality of different software programs, selector switches for selecting a desired program from among the stored programs, a recording device for duplicating the selected program in a recording medium, and a central processing device for retrieving from the memory the desired program when it is selected by the selector switches. The central processing device operates the recording device to duplicate the selected control program in the recording medium. The instrument may further comprise a visual display device on which the selected program is executed during the duplication of the program and/or demonstrated to show the contents of the program before the selected program is duplicated. The memory may include a memory area for storing labelling data used to print labels to identify the programs, and/or sales data representing the number of duplication of each program. The sales data of the program is updated each time the program is duplicated.

27 Claims, 8 Drawing Figures

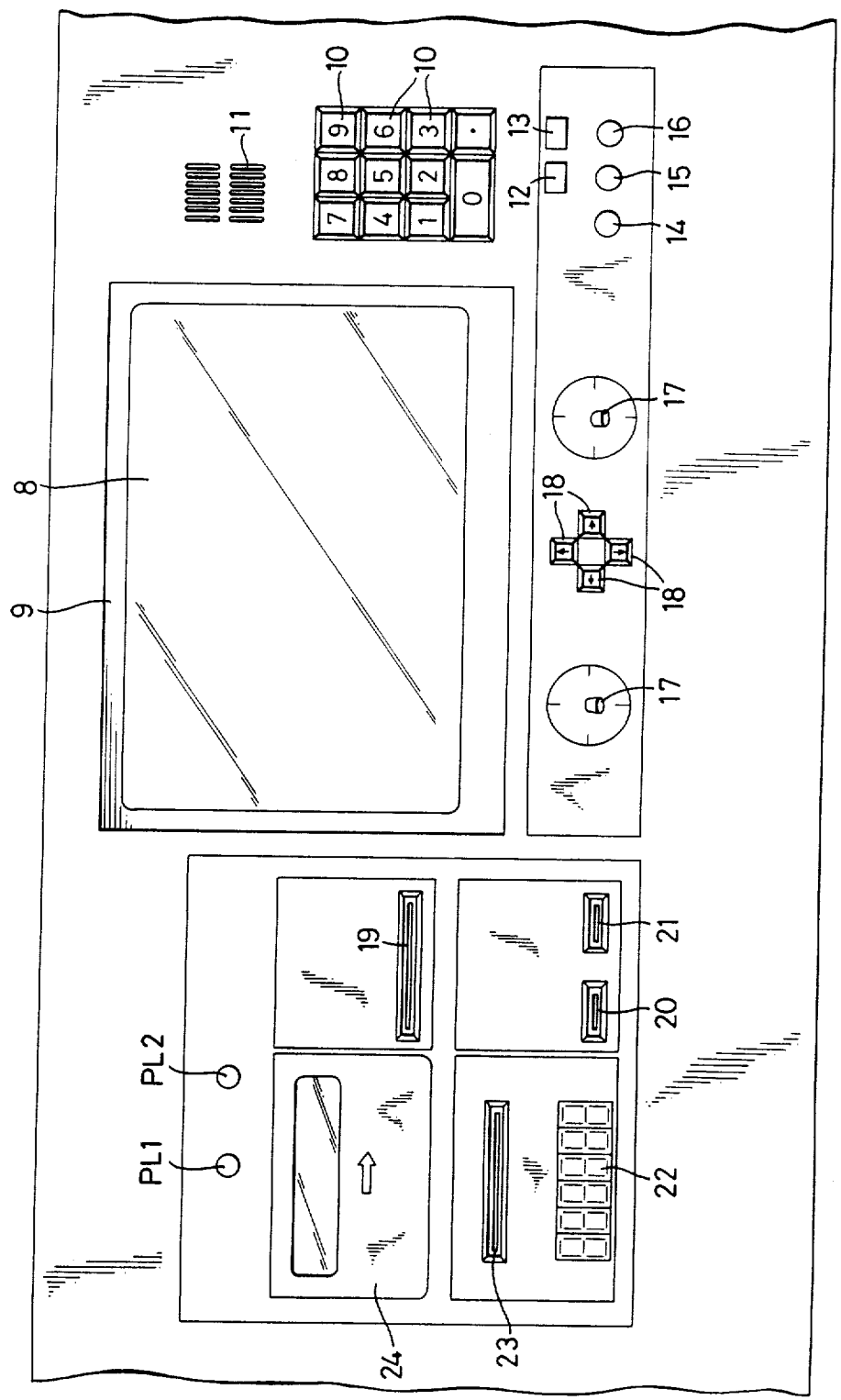

SOFTWARE VENDING INSTRUMENT

BACKGROUND OF THE INVENTION

1. Field of the Invention

The present invention relates to a software vending instrument or machine.

2. Description of the Prior Art

Nowadays, a variety of software programs for video games, and visual (audiovisual) software programs for business and educational purposes are marketed and sold in a large scale, keeping pace with the wide spread or popularization of microcomputers or personal computers. Such software programs are available on the market in the form of tape cassettes or floppy disks in which original or source programs are duplicated or copied by software manufacturers. These tape cassettes and floppy disks having duplicate programs are sold by local software shops or dealers.

In dealing such software-loaded tape cassettes or floppy disks, it is difficult to keep an accurate record or have a predictable prospect of demands of the individual software packages on hand. Accordingly, the software shop owners encounter a great deal of trouble in maintaining optimum stock of the individual packages of software program. For example, programs for popular video games may become out of stock without recognition of insufficiency of the inventory of those programs. In this case, the shop owners have to place an order with a manufacturer or supplier. Further, the shop owner may be at a loss how to dispose of such programs that are not attractive and left in stock in a large amount.

On the other hand, a purchaser of programs for video games, for example, has no means to get concrete on-the-spot information of the content of a game which is played by the program which the purchase is going to buy at a software shop. Thus, the purchaser tends to buy a program, without an exact idea of how the game is actually animated by the program.

SUMMARY OF THE INVENTION

It is accordingly an object of the present invention to provide a software vending instrument which is capable of vending various software programs, without displaying program-loaded recording media such as tape cassettes or floppy disks, and without a cumbersome inventory control of such loaded recording media.

Another object of the invention is to provide such a vending instrument which is further capable of demonstrating the contents of a program which the purchaser is going to buy, to prevent the purchaser from hesitating to buy that program or to avoid an unnecessary trouble between the vender and the purchaser.

A further object of the invention is to provide such a vending instrument which is capable of recording the sales of the individual programs.

Another object of the invention is the provision of such a vending instrument which provides the purchaser with a label to identify a program bought by the purchaser.

According to the present invention, there is provided a software vending instrument comprising: memory means for storing a plurality of different software programs; selector means for selecting a desired one of the software programs; a recording device operable to duplicate or copy the selected software program in a recording medium; and central processing means connected to the memory means, the selector means and the recording device. The central processing means retrieves from the memory means the desired software program when it is selected by the selector means, and operates the recording device to duplicate the selected software program in the recording medium.

In the software vending instrument constructed as described above, a desired software program is selected by the selector means from among the plural software programs stored in the memory means, and the selected program is duplicated in the non-recorded recording medium by the recording device. This arrangement requires mere replenishment of blank recording media which are stored in the instrument, and therefore does not require display of recorded tape cassettes or other recording media at a vender's shop, thereby eliminating the need of controlling an inventory of such recorded recording media in which programs were stored by a software manufacturer.

According to a preferred aspect of the invention, the vending instrument further comprises a visual display device, and the memory means further stores plural sets of demonstration data corresponding to the plural software programs, which sets of demonstration data represent abstracts of the contents of the respective software programs. The central processing emans retrieves from the memory means the set of demonstration data corresponding to the selected software program, and operates the visual display device to execute the retrieved set of demonstration data before the selected software data is duplicated by the recording device.

In the above preferred arrangement, an abstract of the contents of a program selected by the selector means is demonstrated on the visual display device, whereby a purchaser of the program may have a brief idea of the subject matter of the program the purchaser is going to buy. This will prevent the purchaser from hesitating to buy a program due to lack of information sufficient to recognize the contents of the program, and minimizes a trouble between a vender and the purchaser.

In accordance with another preferred aspect of the invention, the visual display device may be used to execute the selected program while the program is being duplicated by the recording device. For example, if a program for a video game is selected, the game is played on the display device. This feature not only helps the purchaser understand the contents of a program being duplicated, but also permits effective utilization of time spent in duplicating the program.

According to an advantageous form of the vending instrument of the invention, a label printer is provided to print labels having imprints to identify the respective software programs. In this instance, the memory means further stores plural sets of labelling data representing the imprints for the individual programs. The central processing means retrieves, from the memory means, the set of labelling data corresponding to the selected software program, and operates the label printer to print the label according to the retrieved labelling data when the selected software program is duplicated.

In the above arrangement, the recording media in which the program was duplicated is provided with the printed label, which is attached to the recorded recording medium by the purchaser, to facilitate identification of the program stored in the recording medium.

In accordance with a further advantageous form of the vending instrument of the invention, the memory means comprises first memory means for storing the software programs, and second memory means for storing sales data representing the number of duplication of the individual software programs. The central processing means updates the sales data of each program when the program is duplicated by the recording device.

The above form of the instrument is capable of recording the amount of sales of the programs on sale, i.e., the total number of duplication of each program. Thus, the owner of the instrument may be provided with information useful for recognizing the popularity of the programs on sale. This sales record information may be displayed on a visual display device or printed on a sheet of paper.

BRIEF DESCRIPTION OF THE DRAWING

The above and other objects, features and advantages of the present invention will be better understood from reading the following description of the preferred embodiment taken in connection with the accompanying drawing in which:

FIG. 2 is a fragmentary plan view of a control table of the vending instrument of FIG. 1;

DETAILED DESCRIPTION OF THE PREFERRED EMBODIMENT

Figure 1:
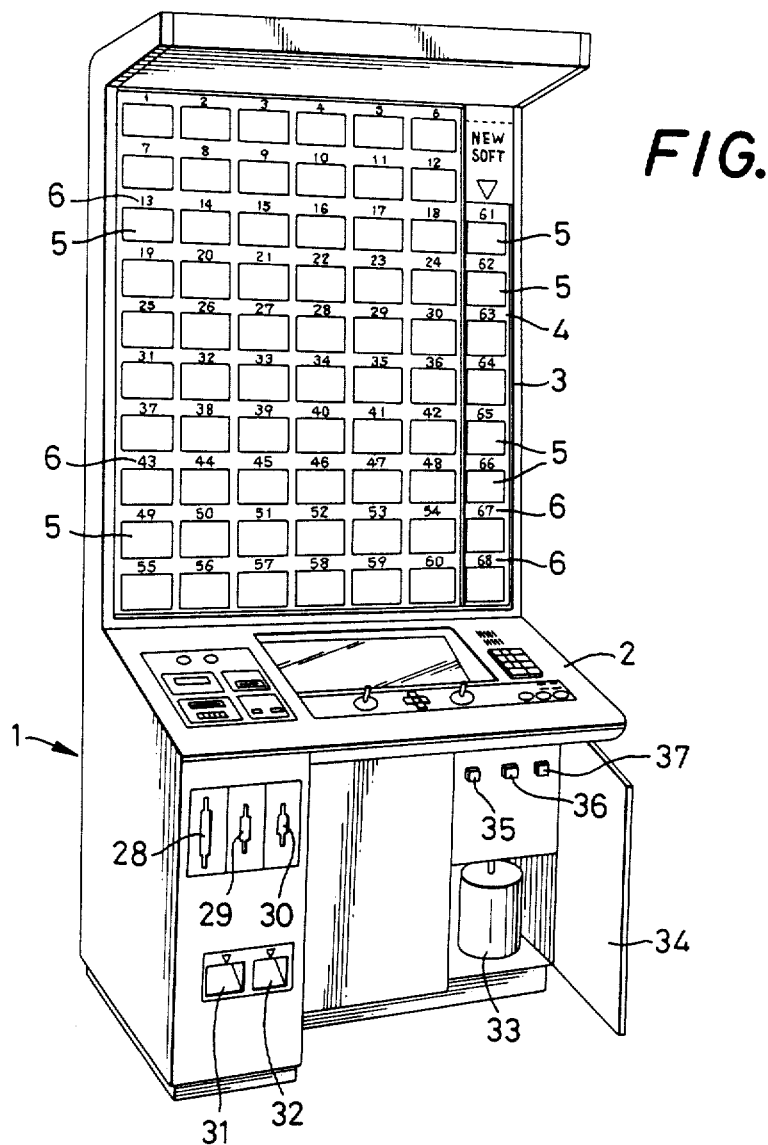
FIG. 1 is a perspective view of one embodiment of a software vending instrument of this invention.

Referring first to FIG. 1, there is shown a preferred embodiment of a software vending instrument of the invention generally indicated at 1. The vending instrument 1 comprises a control table 2 on which are provided various control keys and switches, and other devices used to operate the vending instrument 1. At the rear of this control table 1, is provided a display or exhibition device 3 which stands upright.

The exhibition device 3 comprises a display panel 4 carrying 68 representations 5 which are disposed in plural rows. Each representation 5 consists of a title of a software program and an animated-cartoon or pictorial or illustrative image showing the contents or subject matter of the program. The individual programs indicated by the respective representations 5 are numbered by Serial-No. indicia 6 disposed right above the corresponding representations 5. In this specific embodiment, Serial Nos. 1-20, 21-40, 41-60, and 61-68 respectively designate: software programs for video games (hereinafter referred to as GAME programs); software programs for business purposes (hereinafter referred to as BUSINESS programs); software programs for educational purposes (hereinafter referred to as EDUCATIONAL programs); and such GAME, BUSINESS and/or EDUCATIONAL programs which are newly marketed products. Thus, these software programs identified by the representations 5 and designated by the Serial-No. indicia 6 are classified into three groups, i.e., GAME, BUSINESS and EDUCATIONAL, each group consisting of programs having utilities in the same category. The new software programs, Serial Nos. 61-68 include the GAME, BUSINESS and EDUCATIONAL programs arranged at random.

The exhibition device 3 includes indicator lights 7 (FIG. 5) provided on the inner side of the display panel 4, so as to be located right behind the respective Serial-No. indicia 6. These lights 7 are illuminated under the control of central processing means which will be described.

As shown in FIG. 2, the control table 2 has a visual display device in the form of a cathode ray tube 8 (hereinafter called CRT 8) having a screen which is covered with a transparent glass plate 9. This CRT 8 provides meassages to a purchaser, displays the contents of each program on sale, and serves other functions, as discussed later in detail. The control table 2 further has numeric Ten-keys 10 disposed to the right of the CRT 8 to select a desired one of the 68 software programs through their serial numbers given by the Serial-No. indicia 6. At the back of the numeric Ten-keys 10 is provided a speaker 11 which is adapted to generate sounds for video games, alarm sounds, etc.

In front of the Ten-keys 10, there are disposed a START key 12 to execute the selection of a program which has been designated by the Ten-keys 10, and a RESET key 13 which is used to cancel the selection of a program once effected by depression of the START key 12. Three selecter switches are provided in front of the START and RESET keys 12 and 13: a GAME selector key 14; a BUSINESS selector key 15; and an EDUCATIONAL selector key 16. These selector keys 14, 15 and 16 are used to designate one of the three groups of software programs: GAME; BUSINESS; and EDUCATIONAL. Thus, the numeric Ten-keys 10, and the selector keys 14-16 serve as selector means for selecting a desired software program.

In front of the CRT 8, there are disposed manually-operated means: a pair of joy stick switches 17, and four joy keys 18 located between the switches 17. These switches and keys 17, 18 are used to interact with a selected program when it is executed on the CRT 8, or influence the execution of the program, in particular, to participate in a game which is animated by the selected program executed on the CRT 8. In other words the manipulation of the switches 17 and keys 18 will affect visual images provided on the CRT 8 during execution of the program.

To the left of the CRT 8, there are provided cash-depositing means: a paper-money inlet 19 through which a 1000-yen bill is inserted into the instrument; and 100-yen coin slot 20 through which a 100-yen coin is deposited; and a 10-yen coin slot 21 for depositing a 10-yen coin. An indicator 22 disposed to the left of the 100-yen coin slot 22 indicates the sum of money deposited through the paper-money inlet 19 and the 100-yen and 10-yen coin slots 20 and 21. The indicator 22 further indicates the serial number of a program designated by the Ten-keys 10, and other information. At the back of the indicator 22 is disposed a receipt exit 23 through which is fed out a printed receipt, and a printed sheet which contains a record of sales of the individual programs, as described later in detail. These receipt and sales record sheet are printed by a printer which will be described.

Figure 3:
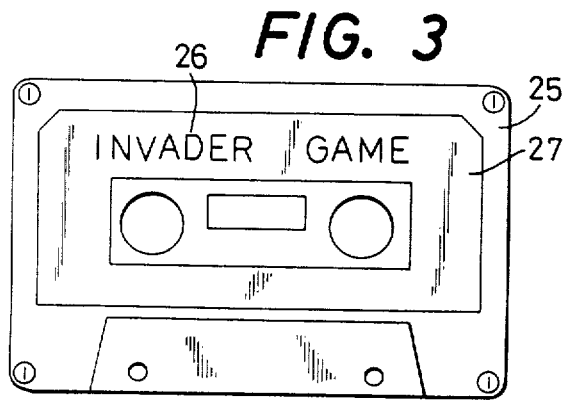
FIG. 3 is a front elevational view of a tape cassette used for the vending instrument.
Figure 4:
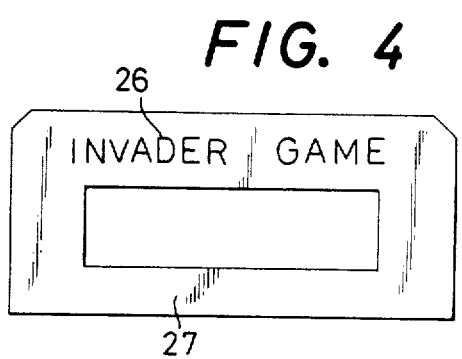
FIG. 4 is a plan view of a label to identify the tape cassette of FIG. 3.

The control table 2 is further provided, at the back of the receipt exit 23, with a tape cassette playback device 24 which is used by the prucchaser to inspect a program bought by the purchaser, and also by an owner of the vending instrument 1 (or any person authorized by the owner) to transfer original or source programs to a hard disk memory 33 described later. The programs stored in the hard disk memory 33 are exhibited on the display panel 4 of the exhibition device 3 as previously discussed. Two indicator lights, "NO-CASSETTE" light PL1 and "COPY" light PL2 are disposed at the back of the tape cassette playback device 24. The "NO-CASSETTE" light PL1 is illuminated when the stock of blank recording medium in the form of a tape cassette 25 of FIG. 3 in the instrument 1 has run out. This non-recorded tape cassette 25 is stored in the instrument in large quantities. The "COPY" light PL2 is illuminated while a selected program is under duplication into the blank tape cassette 25. It is noted here that each of the blank or non-recorded tape cassettes 25 is stored in the instrument 1 without a label 27 (shown in FIGS. 3 and 4) stuck to its front face. This label 27 carries an imprint 26, as shown in FIG. 4, which indicates the title of a program recorded in the tape cassette 25, to identify the program. Blank sheets for the label 27 are stored in the instrument 1, and each blank sheet is printed by a printer referred to later, to provide the label 27 with the imprint 26. The label 27 is supplied to the purchaser so that it is bonded to the tape cassette 25 with an adhesive on one side of the label 27.

On the front left-hand side of the vending instrument 1, there are disposed three floppy disk drives 28, 29 and 30 which accept three different sizes of a floppy disk. These floppy disk drives 28-30 are used to transfer original programs corresponding to the various programs exhibited on the display panel 4, from the appropriate floppy disks to the hard disk memory 33. Thus, the floppy disk drives 28-30 cooperate with the previously described tape cassette playback device 24 to constitute a program-loading device for loading and hard disk memory 33 with the desired programs for a floppy disk or tape cassette which serves as a master storage medium. Below the floppy disk drives 28-30 are provided a cassette tray 31 and a change tray 32. The cassette tray 31 receives the recorded tape cassette 25, and the printed label 27 which carries the imprint 26 to identify the program recorded in the tape cassette 25. The change tray 32 receives change when the amount of money deposited through the inlet 19 and the coin slots 20, 21 exceeds a selling price of a program duplicated in the tape cassette 25.

The hard disk memory 33, serving as first and second memory means, is accommodated within a housing of the instrument 1 which comprises a front door 34 equipped with a lock. The door 34 can be opened only by an authorized person or persons having a key for the lock. The hard disk memory 33 has: a first memory area for storing the 68 programs which are exhibited on the display panel 4; a second memory area for storing labelling data indicative of the titles of these stored programs, which are printed as the imprints 26 on the label 27, and price data indicative of selling prices of the programs; and a third memory area for storing sales data representing the sales records of the individual programs, including the date of sale (year, month and day). The first and second memory areas for the programs and the labelling data serve as the first memory means to which the source programs are loaded or transferred, by the authorized person, from floppy disks or a tape cassette through the floppy disk drives 28, 29, 30 or the tape cassette playback device 24. The third memory area for the sales data, which serves as the second memory means, comprises many divided memory locations corresponding to the dates (year, month and day) of sale of the programs, so that the number of each program sold, i.e., the number of duplications thereof, can be recorded and updated.

In the previously indicated housing, there are disposed three switches: SALES RECORD switch 35; CLEAR switch 36; and WRITE switch 37, which are accessible by opening the front door 34. The SALES RECORD switch 35 is used when it is desired to know the amounts of sales of the individual programs which are recorded in the third memory area of the hard disk memory 33. The CLEAR switch 36 is used to clear the third memory area of the hard disk memory 33 (to erase the sales data). The WRITE switch 37 is used to replace or change the program data in the first memory area of the memory 33 and the labelling data in the second memory area.

Figure 5:
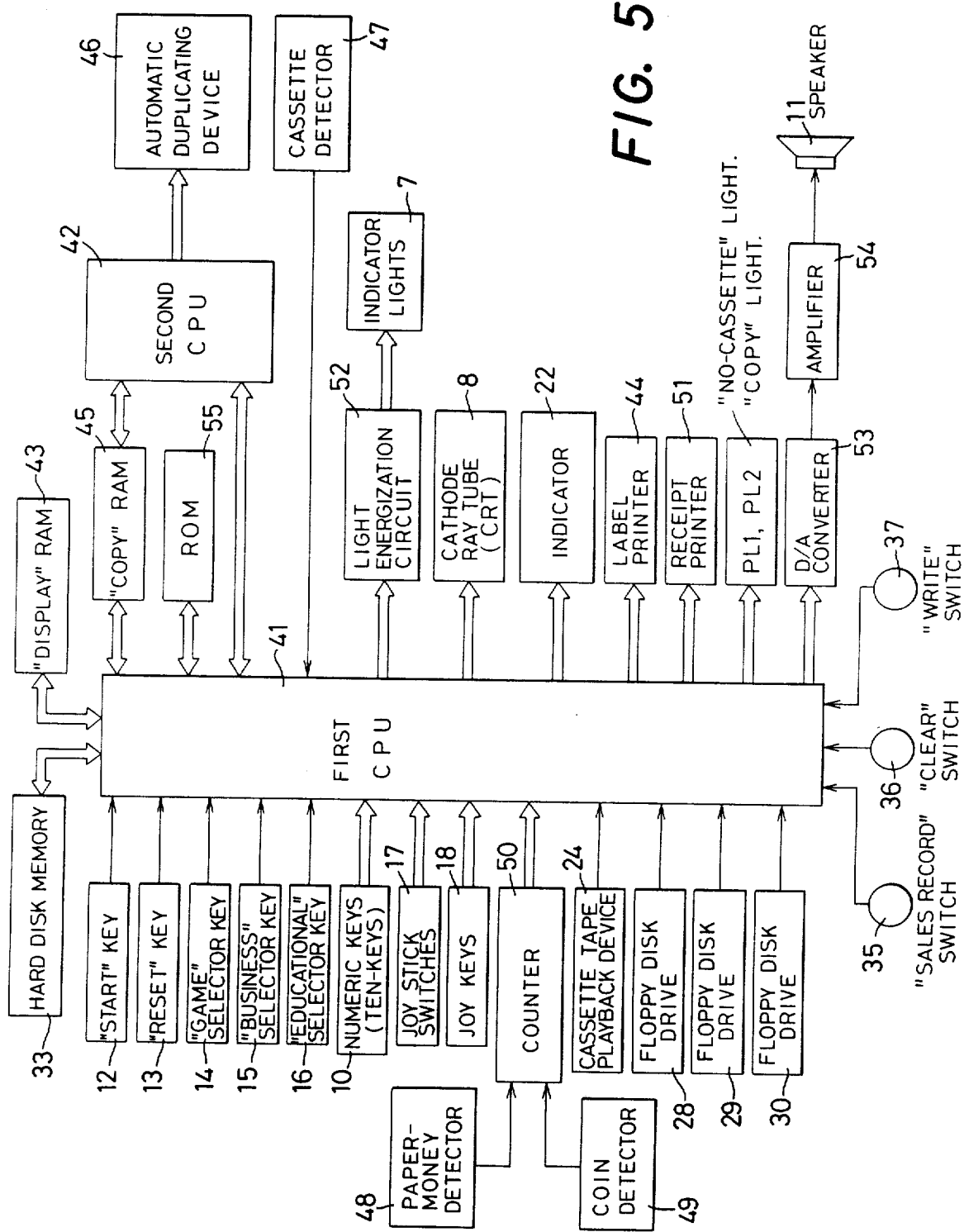
FIG. 5 is a schematic block diagram of a control system of the vending instrument.

Referring next to FIG. 5, a control system of the vending instrument 1 with the foregoing construction will be described below.

The control system comprises a first central processing unit 41 (hereinafter referred to as first CPU 41), and a second central processing unit 42 (hereinafter called second CPU 42). The first and second CPUs 41 and 42, which serve as central processing means, are adapted to exchange data to each other and operate according to a predetermined main program which is stored in a ROM 55 connected to the first CPU 41. The ROM 55 further stores message data representing messages to the purchaser. The message data and the previously indicated price data are both selling information data, which will become apparent from the later description of the operation of the vending instrument. The ROM 55 and the hard disk mememory 33 constitute memory means of the instrument 1. The first CPU 41 receives data or signals from the input devices such as the floppy disk drives 28-30, keys and switches 10, 12-18, and further receives command signals from the second CPU 42, which in turn receives command signals from the first CPU 41.

The first CPU 41 is connected to a random-access memory 43 (hereinafter referred to as "DISPLAY" RAM 43) which is used to operate the CRT 8. When a software program is designated through the selector switches 14-16 and the Ten-keys 10, the designated program data and its related demonstration and labelling data are transferred from the hard disk memory 33 to the "DISPLAY" RAM 43. According to these data stored in the "DISPLAY" RAM 43, the first CPU 41 executes the selected program on the CRT 8, that is, causes the CRT 8 to display the contents of the program, for example, enables a corresponding video game to be played on the screen of the CRT 8. Further, the CPU 41 operates a label printer 44 which is a color-dot printer incorporated in the vending instrument 1, so that the blank label 27 is provided with the appropriate imprint 26. The label 27 is then fed to the cassette tray 31.

The first CPU 41 is further connected to a second random-access memory 45 (hereinafter called "COPY" RAM 45) which, like the "DISPLAY" RAM 43, stores a software program and its related demonstration and labelling data transferred from the hard disk memory 33 when the program is selected. The selected program data and the related data stored in the "COPY" RAM 45 are transferred to the second CPU 42, which operates a recording device in the form of an automatic duplicating device 46 incorporated in the vending instrument 1, so that the selected program is copied or duplicated in the blank tape cassette 25. More specifically stated, the duplicating device 46 records a duplicate program in one of the blank tape cassettes 25 in stock, based on signals from the second CPU 42. The recorded tape cassette 25 loaded with the duplicate program is fed to the cassette tray 31.

A cassette detector 47 is provided to check if the blank tape cassetet 25 is to be supplied to the duplicating device 46 is in stock or not. The cassette detector 47 generates a signal when the blank tape cassette 25 has become out of stock, and the signal is fed to the first CPU 41.

A paper-money detector 48 and a coin detector 49 are provided to detect bills (paper-money) and cons deposited throught he paper-money inle 19 and the coin slots 20, 21. Signals from these detectors 47 and 48 are applied to a counter 50 which counts the sum of the deposited money, and feeds "deposit" data to the first CPU 41. According to the "deposit" data, the first CPU 41 causes the indicator 22 to display the current sum of the deposited money, and controls the printing operation of a receipt printer 51 built into the vending instrument 1 to print out a receipt.

The first CPU 41 controls a light energization circuit 52 which energizes a group of the 68 indicator lights 7 corresponding to the group of programs selected by the GAME, BUSINESS and EDUCATIONAL selector switch 14-16, and effects a flickering or blinking operation of a particular one of the indicator lights 7 corresponding to a particular program selected by the Ten-key 10. A D/A (digital/analog) converter 53 is connected to the first CPU 41 to convert a digital control signal of the first CPU 41 into an analog signal which is amplified by an amplifier 54 and transferred to the speaker 11, so that the speaker 11 generates video game sounds and alarm sounds.

Figure 6:
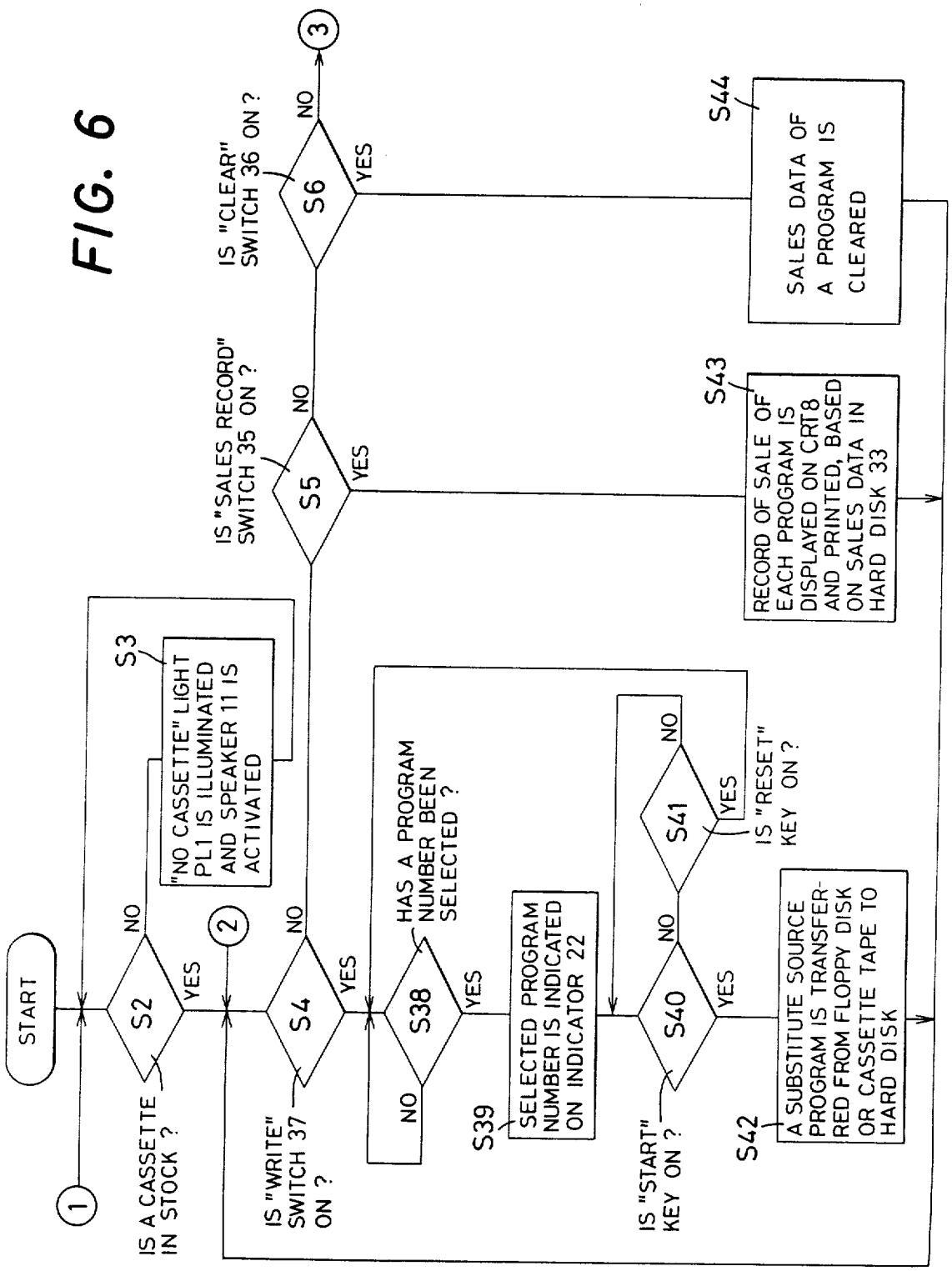
FIGS. 6-8 are schematic block flow charts showing the operations of first and second central processing units of the vending instrument.
Figure 7:
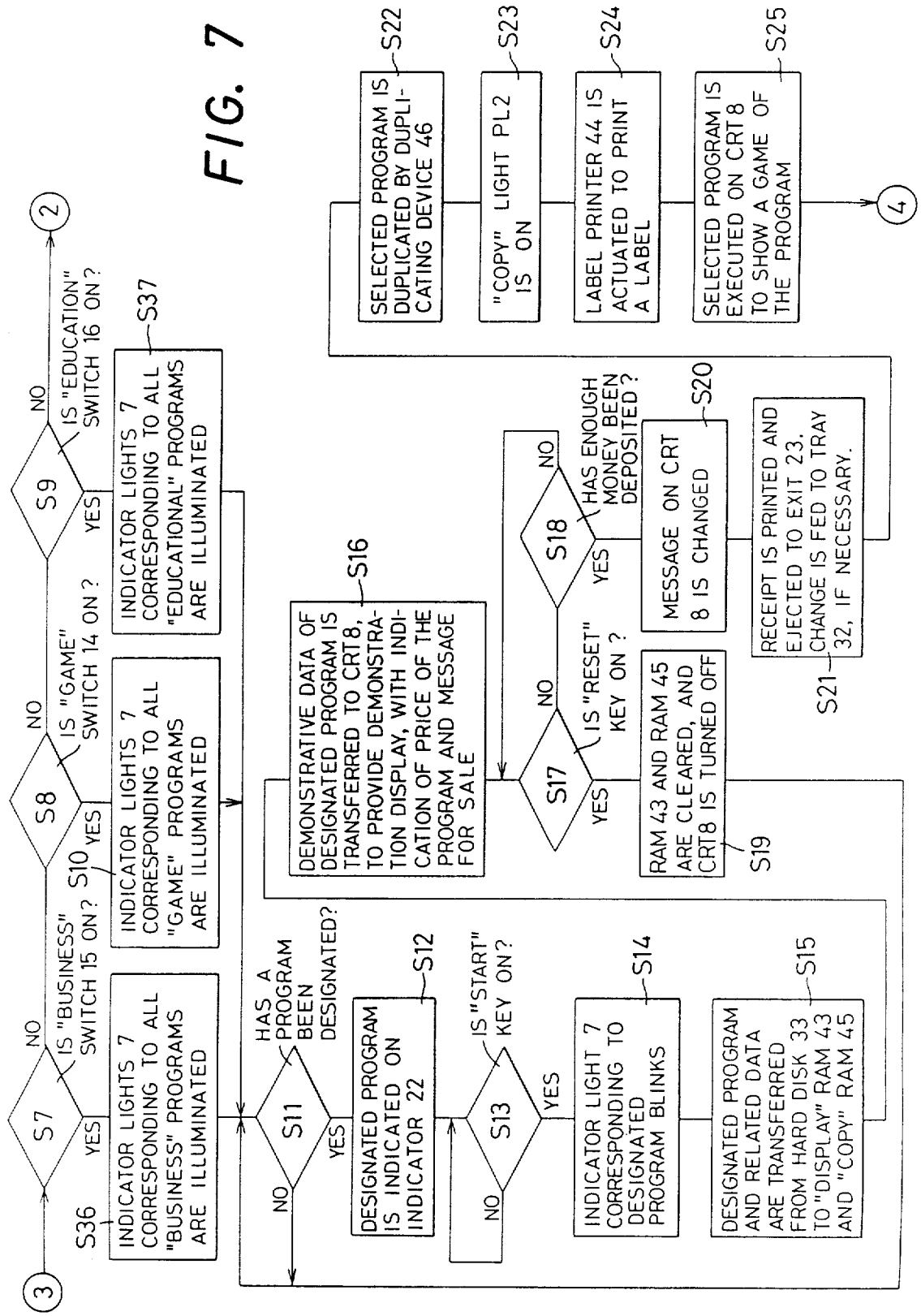
Figure 8:
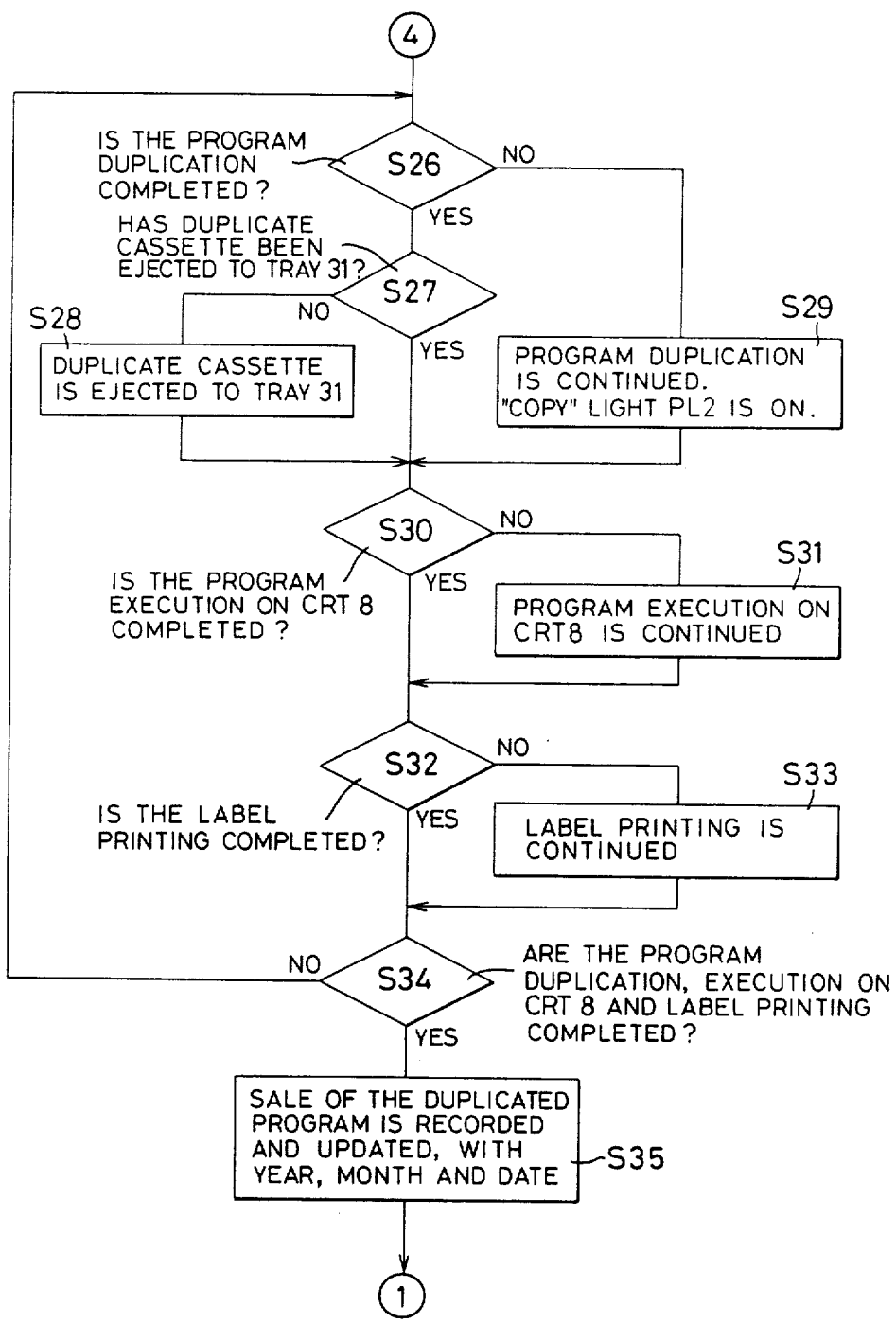

Referring to flow charts of FIGS. 6-8 illustrating the sequence of control by the first and second CPUs 41 and 42, there will be described the operation of the vending instrument 1 which is constructed as discussed hitherto. For easier understanding, steps of operations are numbered in the flow charts, and the step numbers (preceded by letter S) are referred to in the following description.

Upon turning on a power switch (not shown) of the instrument 1 (S1), the first and second CPUs 41, 42 are operated as shown in FIG. 6. At first, the first CPU 41 checks, based on the signal from the cassette detector 47, to see if the blank tape cassette 25 is still in stock (S2). If no blank tape cassette 25 is stored in the instrument 1, the "NO-CASSETTE" light PL1 is illuminated, and the speaker 11 is activated to generate an alarm sound (S3), so that the stock of the blank tape cassette 25 is replenished by the owner of the instrument. When the tape cassette 25 is in stock or the stock of the cassette 25 has been replenished, the first CPU 41 is ready to accept an input by a purchaser or the owner of the instrument through operation of the SALES RECORD, CLEAR and WRITE switches 35, 36, and 37, and the GAME, BUSINESS and EDUCATIONAL selector keys 14, 15 and 16 (S4-S9).

When the purchaser depresses the GAME selector key 14 (S8) to buy a GAME program for a video game, for example, the first CPU 41 operates as shown in FIG. 7. At first, the first CPU 41 activates all of the indicator lights 7 that correspond to all GAME programs (Serial Nos. 1-20, and some of the new programs Serial Nos. 61-68 which are GAME programs), whereby the appropriate Serial-No. indicia 6 on the display panel 4 are illuminated to indicate the program representations 5 of the GAME program group (S10).

Then, the purchaser enters, with the Ten-keys 10, a Serial number corresponding to a desired one of the GAME programs whose representations 5 are illuminated by the indicator lights 7 on the display panel 4. As soon as the desired GAME program has been designated (S11), the Serial number of the GAME program is indicated on the indicator 22 (S12), and the first CPU 41 waits for the activation of the START key 12. In response to an ON signal generated from the START key 12 upon depression thereof (S13), the first CPU 41 causes only the indicator light 7 corresponding to the designated Serial number, to blink or flicker (S14). In the meantime, the first CPU 41 reads out the designated program and its related demonstration and labelling data from the hard disk memory 33, and transfers them to the "DISPLAY" RAM 43 and the "COPY" RAM 45 (S15). The demonstration data represents an abstract of the subject matter of the designated program, more particularly, visual images to provide a brief demonstration of the contents of the program, e.g., abstract views of a video game played by a GAME program. This "demonstration" data is read out from the "DISPLAY" RAM 43, and the demonstration images are displayed on the screen of the CRT 8 according to the "demonstration" data (S16). Simultaneously, the price data stored in the hard disk memory 33 is retrieved to cause the CRT 8 to indicate a selling price of the designated program (S16), and the message data is retrieved from the ROM 55 to provide a message "Please deposit money if you wish to buy this program." (S16). Consequently, the purchaser is able to decide whether to buy the program which has been designated, by observing the demonstration images and the selling price displayed on the CRT 8.

While the demonstration images are viewed on the CRT 8, the first CPU 41 waits for the activation of the RESET key 13 (S17) or the deposit of money (S18). When the purchaser wishes to cancel the designated program, that is, wishes to see demonstration images of another program, the RESET key 13 is depressed. In this instance, the first CPU 41 clears "DISPLAY" RAM 43 and the "COPY" RAM 45, and stops the demonstration on the CRT8 and the flickering operation of the indicator light 7 corresponding to the program which has been demonstrated on the CRT 8 (S19). Then, the first CPU 41 becomes ready to accept the input of a Serial number of another program (S11).

On the other hand, when the purchaser deposits cash through the paper-money inlet 19 and/or the coin slots 20, 21, the first CPU 41 compares the "deposit" data from the counter 50 with the price data read out from the hard disk memory 33. If the sum of the deposited cash is equal to or greater than the predetermined selling price of the designated program, the first CPU 41 changes the preceding message on the CRT 8 to a message "Thank you very much." (S20), and activates the receipt printer 51 to print out a receipt, which is then fed to the receipt exit 23 (S21). In the case where the comparison of the "deposit" data with the price data indicates an overpayment, the appropriate amount of change is supplied to the change tray 32 (S21).

In the meantime, the second CPU 42 retrieves the selected program from the "COPY" RAM 45, and operates the automatic duplicating device 46 to duplicate the retrieved program in the blank tape cassette 25 (S22). As soon as the duplication of the program in the cassette 25 has been started, the first CPU 41 energizes the "COPY" light PL2 (S23, S29)) to inform the purchaser that the selected program is under duplication.

After the illumination of the "COPY" light PL2, the first CPU 41 retrieves the labelling data from the DISPLAY RAM 43, and operates the label printer 44 to print the title of the program under duplication, on the label 27 according to the retrieved labelling data (S24, S33). subsequently, the first CPU 41 directs the CRT 8 to execute the program while it is duplicated (S25, S31)). For example, if the selected program stored in the DISPLAY RAM 43 is a GAME program, the corresponding video game is played or animated on the CRT 8. Thus, the purchaser may enjoy and/or confirm the game played on the CRT 8, and therefore does not feel bored, while the program is being copied.

While the duplication of the program by the duplicating device 46, the label printing by the label printing 44 and the execution of the program on the CRT 8, are in progress, the second CPU 42 continuously checks if the program duplication into the tape cassette 25 has been completed or not (S26), and the first CPU 41 continuously checks if the execution of the program on the CRT 8 has been completed or not (S30), and checks if the label printing is completed or not (S32). Upon completion of the label printing, the printed label 27 is fed to the cassette tray 31. Upon completion of the program duplication, the second CPU 41 causes the duplicating device 46 to eject the recorded tape cassette 25 to the cassette tray 31, and then checks to see if the tape cassette 25 has been received by the cassette tray 31 (S27, S28)).

When the recorded tape cassette 25 and the printed label 27 have been received by the cassette tray 31 and the program execution on the CRT 8 completed (S34), the first CPU 41 proceeds with updating the sales record in the hard disk memory 33 (S35). Described in more detail, the number of sales of the appropriate program which was recorded with the date of sale in the memory 33, is incremented to record the instant sale of the program. Now, the first CPU 41 is ready to accept an input by the purchaser or the owner of the instrument 1.

If the purchaser desires to buy a BUSINESS or EDUCATIONAL program, the BUSINESS or EDUCATIONAL selector key 15 or 16 is depressed (S7, S9). When the BUSINESS selector key 15 is depressed (S7), the indicator lights 7 corresponding to the BUSINESS programs (Serial Nos. 21–40 and some of the new programs Serial Nos. 61–68 which are BUSINESS programs) are activated to illuminate the appropriate Serial-No. indicia 6 on the display board 3 (S36). Similarly, the depression of the EDUCATIONAL selector key 16 (S9) will turn on the indicator lights 7 corresponding to the EDUCATIONAL programs (Serial Nos. 41–60 and some of the new programs Serial Nos. 61–68 which are EDUCATIONAL programs) to illuminate the appropriate Serial-No. indicia 6 (S37).

The above operation of the BUSINESS or EDUCATIONAL selector key 15 or 16 is followed by the operation steps similar to those previously stated in connection with the GAME programs. While a selected BUSINESS or EDUCATIONAL program is duplicated in the tape cassette 25, the program is executed on the CRT 8 (S25) and the title of the program is printed on the label 27 (S24). The recorded cassette 25 and the printed label 27 are fed to the cassette tray 31 (S27, S28, S32), and the sales record of the program in the hard disk memory 33 is updated by incrementing the previously recorded number of sales of the BUSINESS or EDUCATIONAL program which has just been duplicated (S35).

There will be described next a manner in which the stored software program is replaced or changed, a method of knowing the sales records of the programs, and a method of clearing the sales records.

When the owner of the vending instrument 1 wishes to replace one of the programs on sale with a new one, a floppy disk which stores an original or source program of the new program is set in an appropriate one of the floppy disk drives 28, 29 or 30, depending upon the size of the floppy disk. Then, the front door 34 is unlocked with the key to gain an access to the WRITE switch 37. The WRITE switch 37 is activated (S4) while the power ON switch of the vending instrument 1 is in the ON position.

With the WRITE switch 37 activated, the first CPU 41 is ready to accept an input of a serial number of the program which is to be replaced. When the program to be replaced is designated with the Ten-key 10 (S38), the entered serial number is displayed on the indicator 22 (S39). In this condition, the first CPU 41 waits for the depression of the START or RESET key 12 or 13 (S40, S41). If it is desired to change the designated serial number, the RESET key 13 is depressed (S41), and another serial number may be entered through the Ten-keys 10 (S38).

By depressing the START key 12 (S40) after the program to be replaced has been designated with its serial number, the first CPU 41 clears a memory area of the hard disk memory 33 corresponding to the designated program. That is, the first CPU 41 erases the designated program (and its "demonstration data") stored in the first memory area of that memory area, and the related labelling and price data in the second memory area. In the next step, the first CPU 41 retrieves, from the floppy disk, a new software program and its related labelling and price data, and stores these program and labelling and price data into the previously cleared first and second memory areas of the hard disk memory 33 (S42). Thus, the contents of the first and second memory areas corresponding to the designated serial number are replaced with the new program and data transferred from the floppy disk, whereby this newly stored program is duplicated when the serial number in question is designated.

While a floppy disk is used to transfer a new software program to the hard disk memory 33, it is possible to use a tape cassette for this purpose. In this instance, a tape cassette containing a new program is set in the cassete tape playback device 24 and the new program is transferred from this playback device 24 to the designated memory areas of the hard disk memory 33.

When it is desired to know the number of sales of the individual programs on sale, the SALES RECORD switch 35 is depressed (S5) while the power ON switch of the instrument 1 is in the ON position. In response an ON signal from the SALES RECORD switch 35, the first CPU 41 reads out the sales records of the individual programs from the third memory area of the hard disk memory 33, and operates the CRT 8 to display the number of sale of each program (i.e., numerical values showing the number of times the program has been duplicated), with the dates of sale (year, month and day). Further, the same sales records are printed out as a hard copy by the receipt printer 51 (S43).

Thus, the owner of the instrument may be informed of the sales result of each program on sale, by viewing the CRT 8 or seeing the printout prepared by the receipt printer 51.

When it is desired to erase the sales records of the programs, the CLEAR switch 36 is depressed (S6). In response to an ON signal from the CLEAR switch 36, the first CPU 41 clears the third memory area of the hard disk memory 33 (S44), whereby the counting of the number of sales of each program is zeroed, that is, the counting begins with "1".

As described hitherto, a desired one of different software programs stored in the hard disk memory 33 is designatd or selected with the Ten-keys 10, and may be retrieved from the memory 33 by depositing a sufficient amount of money for that desired program. The retrieved program is duplicated in a blank tape cassette, and executed on the CRT 8 to show the contents of the program to the purchaser during the duplication thereof. The recorded tape cassette. 25 with the duplicate program is supplied to the purchaser. Thus, the sale of a program according to the present embodiment of the invention simply requires replenishment of blank tape cassettes, and does not require a software shop owner to display or exhibit recorded tape cassettes storing different programs, thereby eliminating the need of controlling an inventory of the recorded tape cassettes. Further, the purchaser of a program may know the subject of the program by viewing the CRT 8.

The purchaser of the program is provided with the label 27 on which the title of the program duplicated in the tape cassette 25 is printed. This label 27, which is attached to the front face of the tape cassette 25 by the purchaser as shown in FIG. 3, is useful for identifying the program in each tape cassette. Further, the sales record of each program is recorded in the hard disk memory 33 by incrementing the recorded quantity of sale each time the program is duplicated into a blank tape cassette. This sales data in the memory 33 is displayed on the CRT 8 and/or printed on a sheet of paper, whereby the owner of the vending instrument may catch the sales figures of the individual programs.

Further, the sofware programs on sale are easily identified by the representations 5 arranged in rows on the display panel 4 of the exhibition device 3, and the kinds (groups) of the programs, i.e., GAME, BUSINESS and EDUCATIONAL, are readily distinguished from each other by the indicator lights 7, whereby the purchaser may easily select a desired program from among the displayed programs.

The selection of a program by the purchaser is further facilitated by demonstration images or views of the program provided on the CRT 8 when the program is designated and before the purchaser has decided to buy it by depositing a cash. The demonstration images enable the purchaser to grasp the subject of a designated program and consequently relieves the purchaser from anxiety about an inadequate choice of a program which could happen due to lack of information on the contents of the program.

While the present invention has been described in its preferred embodiment, it is to be understood that the invention is not limited thereto; but may be otherwise embodied.

For example, it is possible to provide a printed index card accompanying a casing for a recorded tape cassette, in place of or in addition to the label 27 of the preceding embodiment which has the imprint 26 to represent the title of a purchased program. This index card has an imprint, similar to the imprint 26, to identify a program duplicated in the tape cassette, and an illustration or the like to represent the contents of the program. It is also possible to provide such a cassette casing as indicated above, together with a recorded tape cassette.

Although the label 27 of the preceding embodiment is printed by the label printer 44 to provide the imprint 26, this printing may be effected by the receipt printer 51. Further, the front door 34 enclosing the hard disk memory 33, may use an electronic key rather than a mechanical key. For example, it is possible to open and close the door 34 by using a magnetic identification card owned by an authorized person such as the owner of the instrument 1, or by entering through the Ten-keys 10 a key number known only to the authorized person. Further, it is appreciated that the SALES RECORD, CLEAR and WRITE switches 35, 36 and 37 be replaced by the Ten-keys 10 so that the front door 34 may be eliminated. In this instance, the functions of the switches 35–37 may be achieved by entering predetermined key numbers through the Ten-keys.

While the preceding preferred embodiment uses a tape cassette as recording medium for storing a duplicate program, it is possible to use a floppy disk as the recording medium. The recording media such as tape cassettes and floppy disks need not be stored within the vending instrument, but may be provided by a purchaser. In this instance, an appropriate recording medium is set in place in the instrument by the purchaser before a selected program is recorded in that recording medium. Further, the exhibition device 3 may be eliminated. In the latter case, the vending instrument 1 is accompanied with a catalog showing software programs on sale, so that a purchaser may select a desired program by consulting the catalog.

While the foregoing preferred embodiment of the instrument are equipped with means to receive and detect cash such as paper money and coins used to pay for programs, the payment by the purchaser may be made in any other suitable manners. For example, a token or a magnetic cash card may be used to pay for the programs. In this case, the instrument is accordingly modified to receive and detect such token or magnetic cash card.

It is apparent that other changes and modifications may be made in this invention without departing from the scope of the invention defined in the appended claims.

What is claimed is:

1. A software vending instrument comprising:
memory means for storing a plurality of different software programs;
a program-loading device adapted to receive a master storage medium for loading said memory means with at least one of said plurality of different software programs from said master storage medium;
selector means for selecting a desired one of said software programs stored in said memory means;
a recording device operable to duplicate the selected software program in a recording medium;

central processing means, connected to said memory means, said selector means, said recording device and said program-loading device, for operating said program-loading devices to load said memory means with said at least one of said plurality of different software programs when said master storage medium is received in said program-loading device, and for retrieving from said memory means said selected software program when said desired one of said software programs is selected by said selector means, and operating said recording devices to duplicate said selected software program in said recording medium.

2. A software vending instrument as set forth in claim 1, further comprising a visual display device, said central processing means operating said visual display device to execute said selected software program while the selected software program is being duplicated by said recording device.

3. A software vending instrument as set forth in claim 1, further comprising a visual display device, said central processing means operating said visual display device to execute said selected software program while the selected software program is being duplicated by said recording device.

4. A software vending instrument as set forth in claim 1, further comprising a visual display device, said memory means further storing plural sets of demonstration data corresponding to said plurality of different software programs, said sets of demonstration data representing abstracts of the contents of the respective software programs, said central processing means retrieving from said memory means the set of demonstration data corresponding to the selected software program, and operating said visual display device to execute the retrieved set of demonstration data before said selected software data is duplicated by said recording device.

5. A software vending instrument as set forth in claim 1, further comprising a control table which includes numeric keys serving as said selector means to input numerical values for designating said software programs, said control table further including manually-operated means operable to influence the execution of the selected software program designated by said numeric keys.

6. A software vending instrument as set forth in claim 5, further comprising a visual display device, said central processing means operating said visual display device to execute said selected software program while the selected software program is being duplicated by said recording device, said manually-operated means affecting visual images provided on said visual display device during execution of said selected software program.

7. A software vending instrument as set forth in claim 1, wherein said programloading device comprises at least one floppy disk drive operable to drive a floppy disk as said master storage medium for loading said memory means with said at least one of said different software programs.

8. A software vending instrument as set forth in claim 1, wherein said programloading device comprises a playback device operable to playback a tape cassette as said master storage medium for loading said memory means iwth said at least one of said different software programs.

9. A software vending instrument comprising:

memory means for storing a pluraliy of different software programs;

selector means for selecting a desired one of said software programs;

a recording device operable to duplicate the selected software program in a recording medium;

a visual display device for executing the selected software program;

central processing means, connected to said memory means, said selector means, said recording device and said visual display device, for retrieving from said memory means said selected software program when said desired one of said software programs is selected by said selector means, for operating said recording device to duplicate said selected software program in said recording medium, and for operating said visual display device to execute said selected software program while said selected software program is being duplicated by said recording device; and manually-operated means, connected to said central processing means, for influencing visual images provided on said visual display device during execution of said selected software program.

10. A software vending instrument as set forth in claim 9, wherein said memory means further stores plural sets of demonstration data corresponding to said plurality of different software programs, said sets of demonstration data representing abstracts of the contents of the respective software programs, said central processing means retrieving from said memory means the set of demonstration data corresponding to the selected software program, and operating said visual display device to execute the retired set of demonstration data before said selected software data is duplicated by said recording device.

11. A software vending instrument as set forth in claim 9, wherein said memory means further stores selling information data representing selling information given to a purchaser of the software programs, said central processing means retrieving from said memory means said selling information data and operating said visual display device to display said selling information to response to operation by said purchaser.

12. A software vending instrument as set forth in claim 11, wherein said selling information data comprises price data representing selling prices of said software programs, and message date representing messages to said purchaser, said memory means comprising one memory which stores said software programs and said price data, and another memory which stores said message data.

13. A software vending instrument as set forth in claim 9, further comprising a label printer operable to print labels having imprints to identify the respective software programs, said memory means further storing plural sets of labelling data representing said imprints, said central processing means retrieving from said memory means the set of labelling data corresponding to said selected software program, and operating said label printer to print the label according to the retrieved labelling data when said selected software program is duplicated by said recording device.

14. A software vending instrument as set forth in claim 9, further comprising an exhibition device including program representations showing the contents of said software programs, serial number indicia disposed adjacent to the respective program representations and numbering said software programs, indicator lights disposed corresponding to said program representations and said serial number indicia, and a light energization circuit connected to said central processing means to energize said indicator lights corresponding to said selected software programs.

15. A software vending instrument as set forth in claim 14, wherein said plurality of different software programs are classified into plural groups, each group consisting of software programs in the same category, said selector means comprising group selector means for selecting said plural groups, respectively, and numeric keys to input numerical values respectively, and numeric keys to input numerical values for designating said desired one of the software programs which are numbered by said serial number indicia, said central processing means controlling said light energization circuit to energize said indicator lights which correspond to one of said plural groups of the software programs which is selected by the group selector means.

16. A software vending instrument as set forth in claim 15, wherein said central processing means controls said light energization circuit to blink one of said indicator lights corresponding to said desired one of the software programs which is designated by said numeric keys.

17. A software vending instrument as set forth in claim 9, wherein said memory means comprises first memory means for storing said software programs, and second memory means for storing sales data representing the number of duplications of each of said software programs, said central processing means updating said sales data when said each software program is duplicated by said recording device.

18. A software vending instrument as set forth in claim 9, wherein said second memory means includes memory locations corresponding to dates of sale of said software programs.

19. A software vending instrument as set forth in claim 9, further comprising cash-depositing means through which money is deposited, and a counter for counting a sum of said money deposited through said cash-depositing means.

20. A software vending instrument as set forth in claim 19, wherein said memory means further stores plural sets of price data representing selling prices of said software programs, said central processing means comparing the content of said counter with the set of price data corresponding to said selected software program, said central processing means operating said recording device to duplicate said selected program when said content of the counter is not smaller than said set of price data corresponding to said selected software program.

21. A software vending instrument as set forth in claim 20, further comprising a receipt printer operable to print a receipt, and a receipt exit through which said receipt is fed, said central processing means operating said receipt printer according to said set of price data when said selected program is duplicated by said recording device.

22. A software vending instrument as set forth in claim 20, further comprising an indicator to indicate said sum of money counter by said counter.

23. A software vending instrument as set forth in claim 20, further comprising a change tray for receiving change when said sum of money counted by said counter is greater than the selling price represented by said set of price data corresponding to said selected program.

24. A software vending instrument as set forth in claim 21, wherein said memory means comprises first memory means for storing said software programs, and second memory means for storing sales data representing the number of duplications of each of said software programs, said central processing means updating said sales data when each said software program is duplicated by said recording device, said receipt printer being operable to print said sales data.

25. A software vending instrument comprising:
memory means for storing a plurality of different software programs;
a program-loading device adapted to receive a master storage medium for loading said memory means with at least one of said plurality of different software programs from said master storage medium;
selector means for selecting a desired one of said software programs stored in said memory means;
a recording device operable to duplicate the selected software program in a recording medium;
a visual display device;
central processing means, connected to said memory means, said program-loading device, said selector means, said recording device and said visual display device, for operating said program-loading device to load said memory means with said at least one of said plurality of different software programs when said master storage medium is received in said program-loading device, and for retrieving from said memory means said selected software program when said desired one of said software programs is selected by said selector means, and operating said recording device to duplicate said selected software program in said recording medium, said central processing means further operating said visual display device to execute said selected software program while the selected software program is being duplicated by said recording device; and
manually-operated means, connected to said central processing unit and said visual display device, for affecting visual images provided on said visual display device during execution of said selected software program on said visual display device.

26. A software vending instrument as set forth in claim 25, wherein said program-loading device comprises at least one floppy disk drive operable to drive a floppy disk as said master storage medium for loading said memory means with said at least one of said different software programs.

27. A software vending instrument as set forth in claim 24, wherein said program-loading device comprises a playback device operable to playback a tape cassette as said master storage medium for loading said memory means with said at least one of said different software programs.

* * * * *